United States Patent [19]

Meiers

[11] Patent Number: 4,457,226
[45] Date of Patent: Jul. 3, 1984

[54] TWINE-WRAPPING MECHANISM FOR A LARGE ROUND BALER

[75] Inventor: Gerald F. Meiers, Ottumwa, Iowa
[73] Assignee: Deere & Company, Moline, Ill.
[21] Appl. No.: 303,274
[22] Filed: Sep. 17, 1981
[51] Int. Cl.³ .............................................. B65B 13/18
[52] U.S. Cl. ........................................ 100/5; 56/341; 100/13; 100/88; 242/149
[58] Field of Search ............................ 100/5, 13, 88, 4; 56/341; 242/149

[56] References Cited

U.S. PATENT DOCUMENTS

| | | | |
|---|---|---|---|
| 2,468,641 | 4/1949 | Scranton | 100/5 |
| 3,894,484 | 7/1975 | Anstey | 100/5 |
| 3,913,473 | 10/1975 | Meiers | 100/5 |
| 4,009,559 | 3/1977 | Mast | 100/88 X |
| 4,024,804 | 5/1977 | Hanson | 100/5 |
| 4,057,954 | 11/1977 | Mast | 100/5 |
| 4,062,279 | 12/1977 | Grube et al. | |
| 4,072,095 | 2/1978 | Campbell et al. | |
| 4,150,614 | 4/1979 | Schwartz | |
| 4,167,844 | 9/1979 | Freimuth et al. | |
| 4,182,235 | 1/1980 | Harig | |
| 4,253,387 | 3/1981 | Schmitt | 100/5 |

*Primary Examiner*—Billy J. Wilhite

[57] ABSTRACT

An automatic twine-wrapping mechanism for a large round baler. The mechanism comprises a twine dispensing mechanism for dispensing twine into the bale-forming chamber of the baler, a reversible hydraulic drive means for cycling a twine arm of the dispensing mechanism back and forth in front of the chamber, a twine wrapping control mechanism for initiating a twine wrapping cycle by sensing the growth of a bale to a predetermined diameter, by automatically actuating a pump drive means for driving a hydraulic pump and by positioning a hydraulic control valve to condition the hydraulic drive means to cycle the twine arm and for terminating a twine wrapping cycle by deactivating the hydraulic drive means following the wrapping of twine around the bale. The twine is automatically severed by a twine cutter responsive to the movement of the twine arm following completion of the wrapping of the twine around the bale. The bale operator actuates a bale ejection mechanism following the cutting of the twine. Following bale ejection, the twine wrapping cycle is terminated by the twine wrapping control mechanism sensing that the bale chamber is empty. The baler is now ready to begin the formation of another bale therein.

Also, the twine arm includes a tubular guide and guide support, which in conjunction with a twine tensioner of the twine dispensing mechanism enables simplified threading of twine through the dispensing mechanism.

28 Claims, 16 Drawing Figures

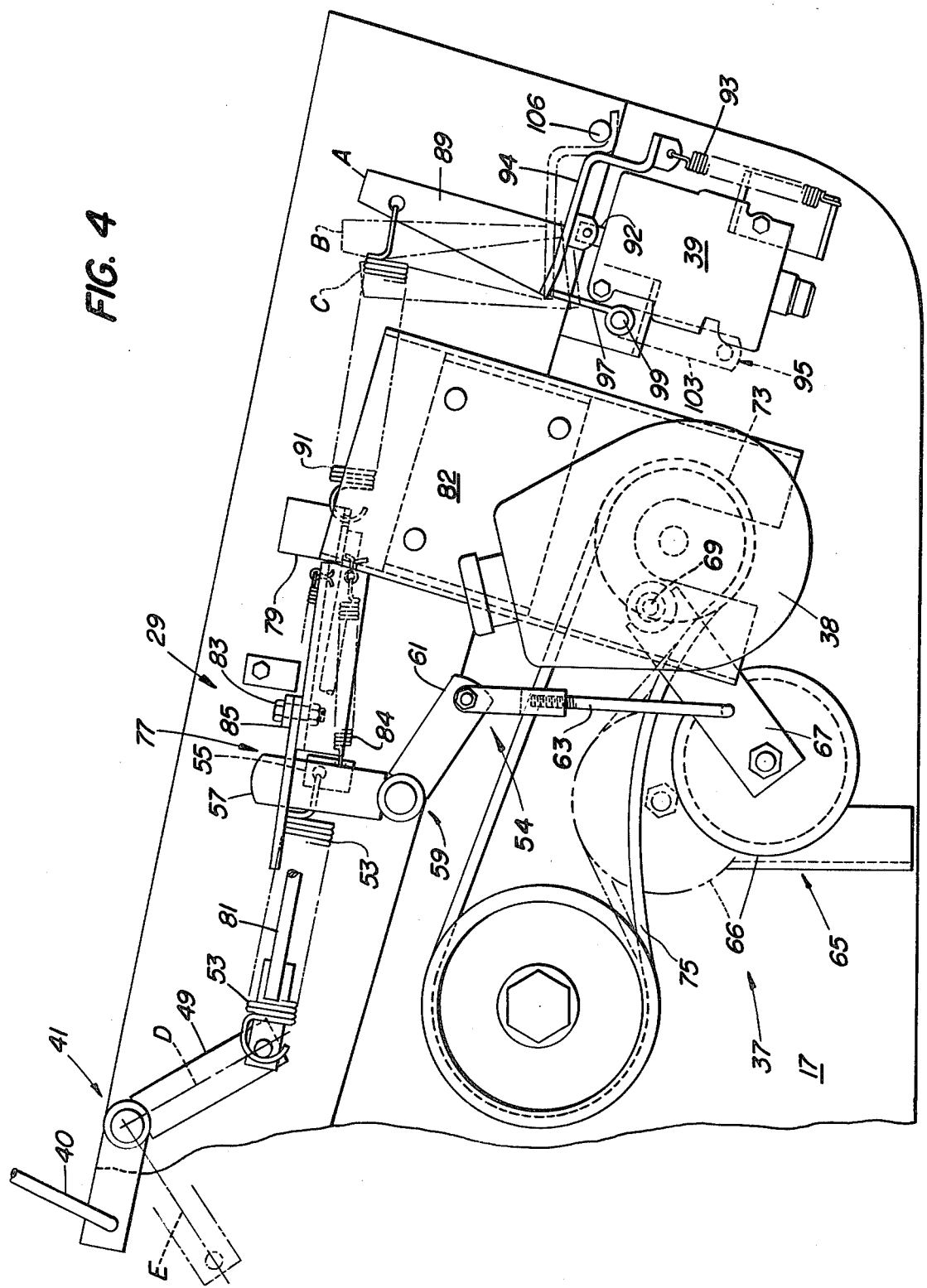

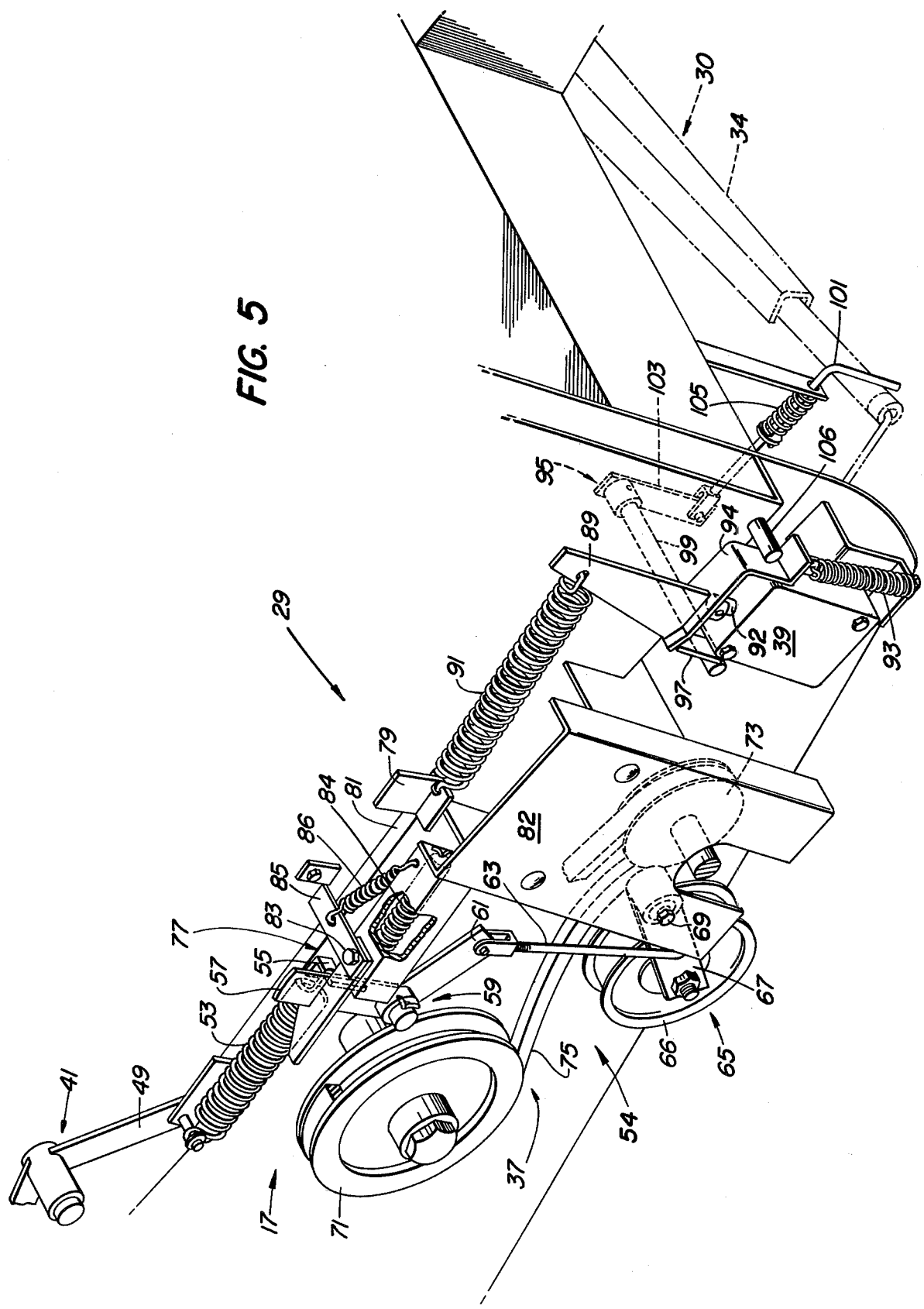

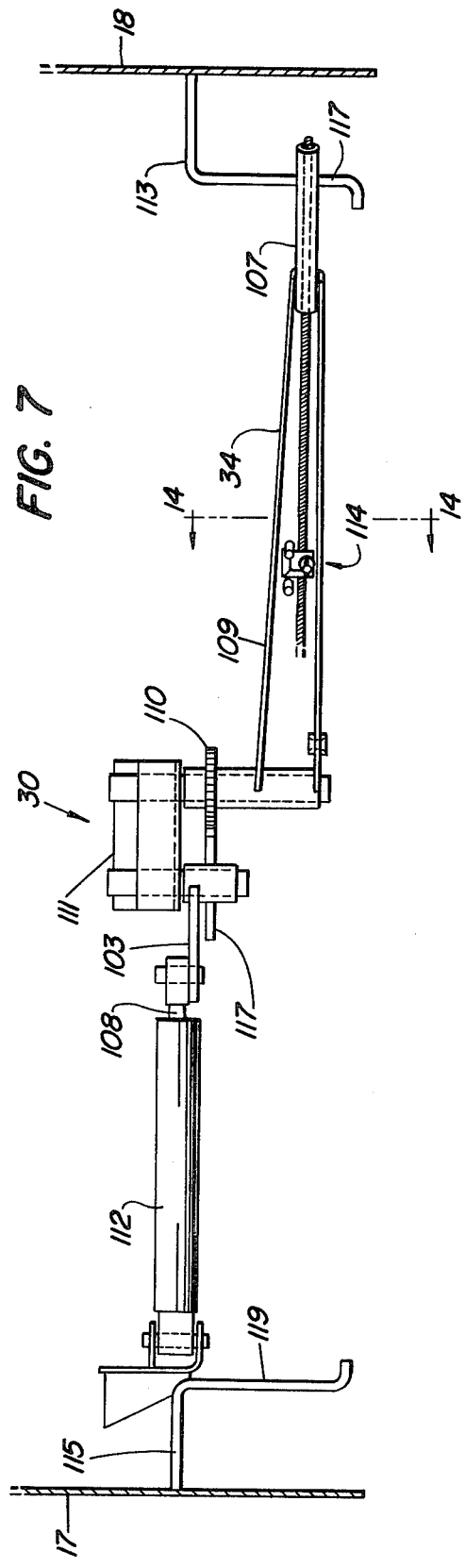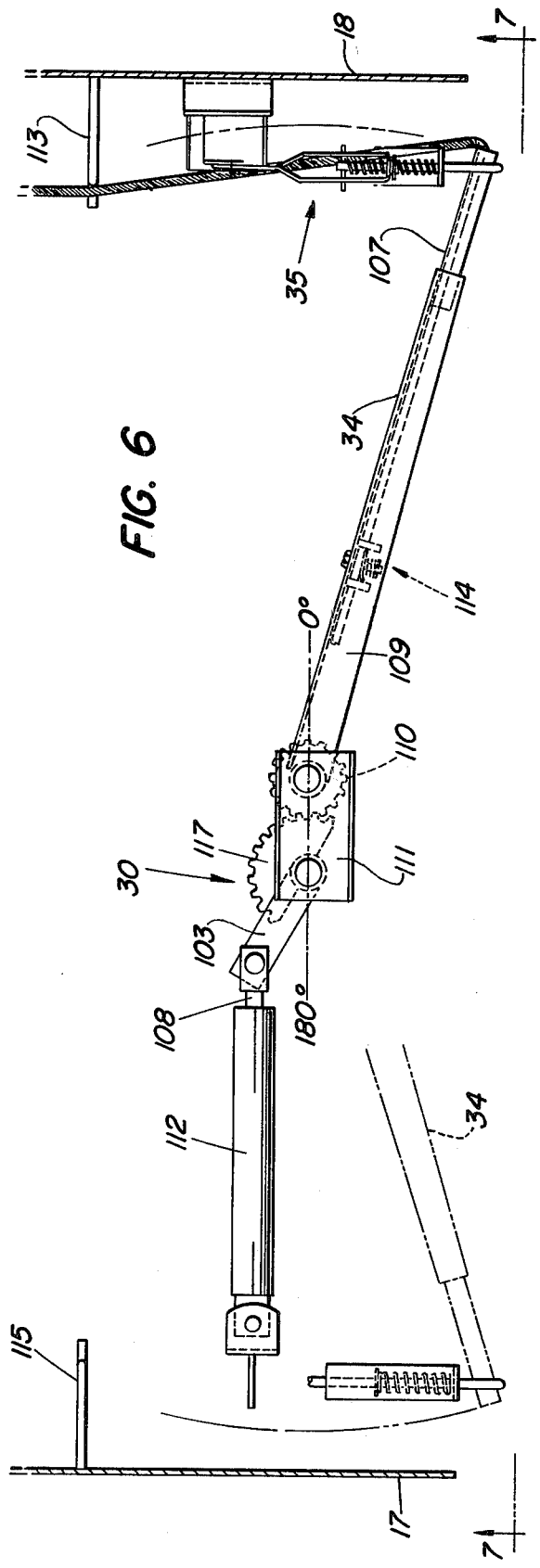

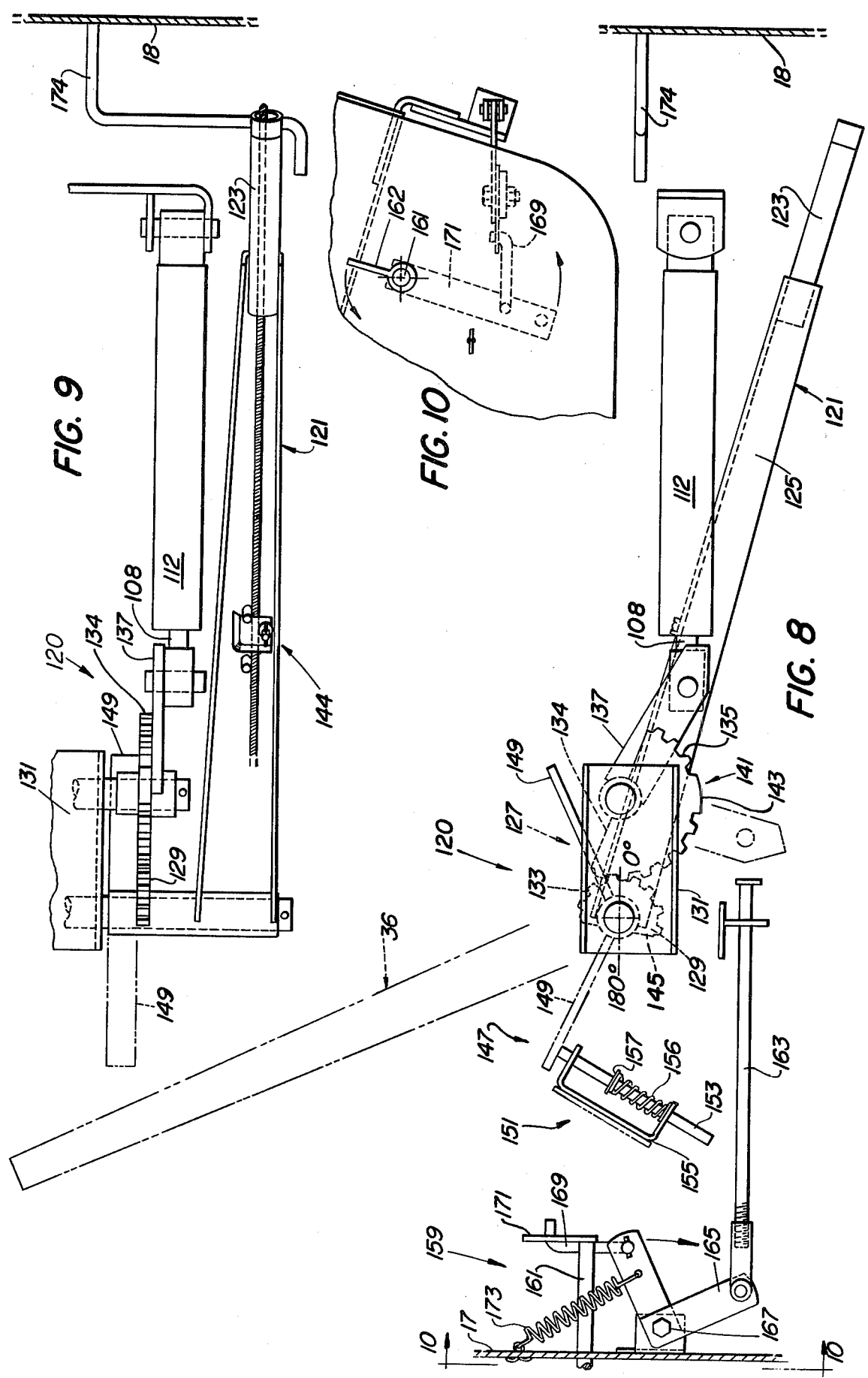

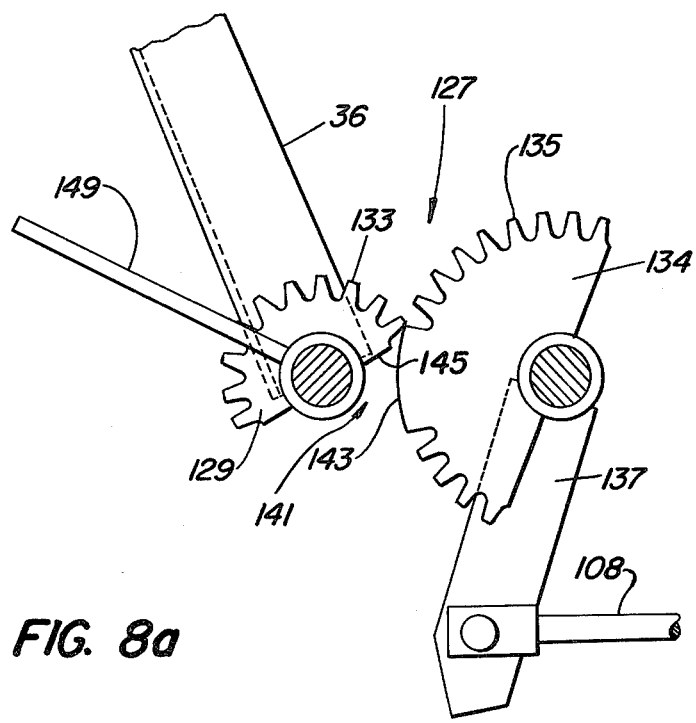
FIG. 8a
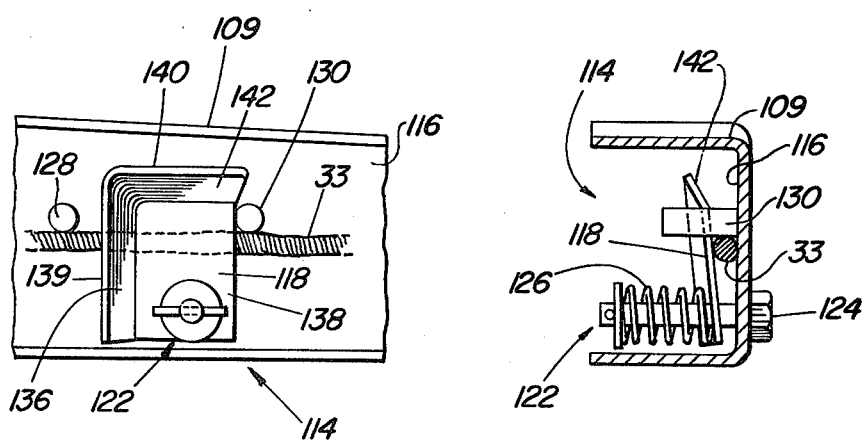
FIG. 15
FIG. 14

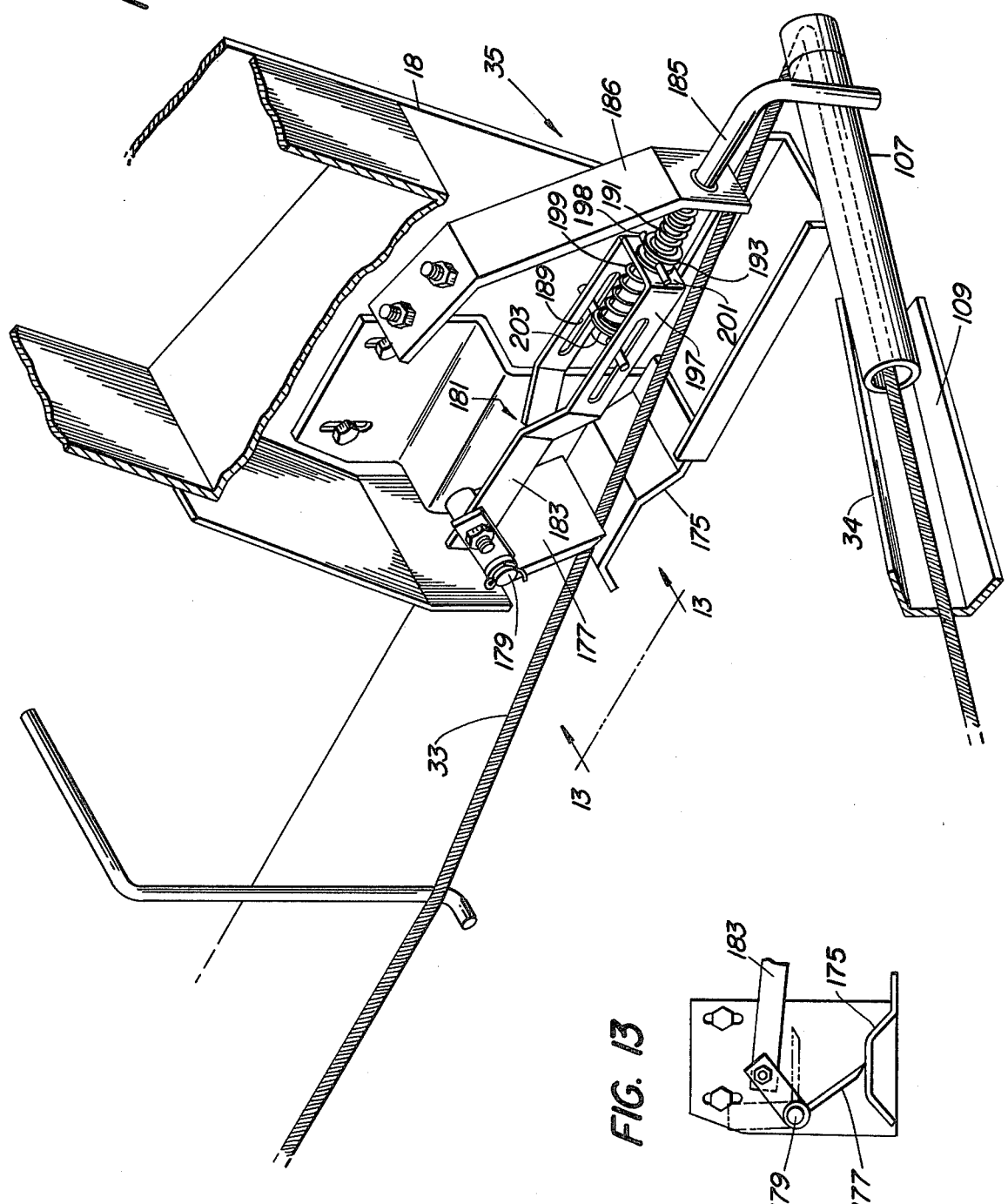
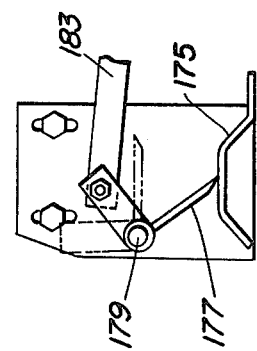

TWINE-WRAPPING MECHANISM FOR A LARGE ROUND BALER

CROSS REFERENCE TO RELATED APPLICATIONS

U.S. application Ser. No. 285,178 entitled STAGGERED ROLLS AND BELTS FOR ROUND BALER and filed on July 20, 1981, now U.S. Pat. No. 4,399,746, in the name of Jean Viaud is directed to a round baler having a bale-forming chamber defined by a plurality of belts trained about a plurality of rolls. The path of some of the belts around the rolls is varied so as to form openings through which crop material in regions adjacent the bale-forming chamber may escape.

U.S. application Ser. No. 308,223 entitled BELT TENSIONING SYSTEM FOR ROUND BALERS and filed on Oct. 5, 1981, now U.S. Pat. No. 4,391,187, in the name of Koning et al is directed to a round baler with a bale-forming chamber defined by a plurality of belts trained about a plurality of rolls. A pair of the rolls is journalled on a carrier arm and is movable on the arm during bale formation to control the size of the bale chamber and the density of the bale being formed in the chamber.

BACKGROUND OF THE INVENTION

This invention is directed to a baler (commonly known as "round baler") for forming cylindrical bales and having a bale-forming chamber defined by a plurality of belts trained about a plurality of rolls and, more particularly, to an automatic mechanism for wrapping twine around bales formed in the chamber.

Semiautomatic twine wrapping machanisms for round balers for agricultural crops are well known. One commercially available wrapping mechanism is similar to that disclosed in U.S. Pat. Nos. 3,894,484 and 3,913,473. The mechanism comprises generally a hydraulically driven twine arm which is movable back and forth in front of an entrance to the bale-forming chamber. Initiation and termination of the twine wrapping cycle is manually controlled. The rate of advance of the arm transversely of the bale-forming chamber is subject to manual control by the adjustment of the flow control valve in the hydraulic circuit. Following extended commercial use, certain disadvantages for this mechanism have been noted. First, it is desirable to provide automatic (rather than semiautomatic) initiation and termination of the twine-wrapping cycle. Heretofore the operator monitored a bale size gauge on the front of the baler from the operator's position on the tractor pulling the baler. When the bale reached the desired size, the operator then continued baling and pulled a hydraulic lever to actuate movement of the twine arm from a first side of the baler to the second. When the twine is fed with the crop material into the bale-forming chamber, the tractor is stopped to discontinue feeding crop into the chamber. The lever is retained in its shifted position until the twine arm reached the second side and held there to allow one or more turns of twine to go around the end of the bale. Then, the hydraulic lever is shifted to reverse the hydraulic drive so that the twine arm is driven back to the first side of the baler. The rate of movement of the twine arm from the second to the first side of the baler and therefore the number of wraps of twine around the bale is controllable by adjustment of the flow control valve in the hydraulic circuit. The rate of flow is adjusted such that at least one full wrap of twine is formed around the end of the bale. The twine is then automatically cut. With the automation of such procedure, the burden on the operator of monitoring the operation of the machine behind him from his position in front of the tractor would, of course, be relieved.

Secondly, it has been found that the procedure for threading twine through the twine arm, which is an elongated tubular member pivoted at one end, is unduly tedious. To thread the twine, it is necessary to push the twine through the elongated tube until it reaches the free end of the tube. Often the twine hangs in the tube and must be manually pulled through with the aid of a threading member, such as a stiff wire.

Thirdly, it was found that the prior art twine cutter mechanism required precision of manufacture, initial adjustment, and also required maintenance to ensure reliable cutting. The prior art twine cutter is actuated by the travel of the twine arm from the second to the first side of the baler which pivots an anvil into engagement with a knife with the twine disposed therebetween. Any overtravel of the twine arm provided excessive pressure to be exerted by the anvil on the knife edge, tending to dull or bend the knife edge.

It is also known to provide a fully automated twine-wrapping mechanism using a mechanical drive from the PTO to drive a pair of twine arms transversely of the bale-forming chamber. See, for example, U.S. Pat. No. 4,167,844.

Further, it is known to provide a fully automated twine-wrapping system using a spring drive for moving a single twine arm from a first side to the second side of the baler and a hydraulic drive for moving the twine arm from the second side back to the first side. See U.S. Pat. No. 4,150,614.

Accordingly, it is an object of this invention to provide an improved, fully automated hydraulically driven twine-wrapping mechanism.

Another object of this invention is to provide a simple, reliable twine-wrapping control mechanism which automatically controls the actuation of the hydraulic pump and control valve of the hydraulic drive means for the twine-dispensing mechanism.

Another object of the invention is to provide an automatic hydraulically driven twine-wrapping mechanism with a hydraulic drive means including a clutch for permitting the twine arm to dwell and provide additional wraps of twine around one end of the bale.

Another object is to provide a hydraulically driven twine-wrapping mechanism which has a unitary relatively long twine dispensing arm for a small width round baler and which is operable to provide additional wraps of twine around each end of the bale.

Another object of the invention is to provide a twine-wrapping mechanism with a twine arm permitting simplified threading of the twine therethrough.

Still another object of the invention is to provide a twine tensioner permitting simplified disposition of the twine therethrough.

Still another object of the invention is to provide an improved twine cutter which has an improved life and requires lower precision of manufacture, adjustment and maintenance.

SUMMARY OF THE INVENTION

These and other objects of the invention are accomplished by automatic twine-wrapping mechanism for a cylindrical baler comprising a twine-dispensing mechanism for dispensing twine into the bale-forming chamber for wrapping around a bale being formed therein. The dispensing mechanism includes a twine arm movable back and forth in front of the bale-forming chamber between first and second positions. The twine arm is driven back and forth in front of the bale-forming chamber by a hydraulic drive means. The drive means includes (1) a cylinder, (2) a hydraulic pump connected to the cylinder, (3) a pump drive for selectively driving the pump, and (4) a control valve interconnected between the cylinder and the pump. The valve conditions the hydraulic drive means such that the twine arm is driven from the first position to the second position and from the second position back to the first position respectively. A control means initiates a twine-wrapping cycle by automatically actuating the pump drive means and positioning a valve control arm in a first valve control arm position for moving the twine arm from its first to its second position responsive to the formation of a completed bale in the chamber and terminates a twine-wrapping cycle by deactivating the hydraulic drive means following completion of the wrapping of twine around the bale.

In the preferred embodiment, the control means includes (1) a bell crank movable between a first crank position corresponding to when the bale chamber is empty or when the bale chamber has a diameter that is less than a predetermined value and a second crank position corresponding to when a bale in the chamber has a diameter greater than a predetermined value responsive to the change in diameter of a bale in the chamber, (2) an idler linkage connected to an idler of the pump drive means (which is a belt drive) and (3) an idler spring connected between the bell crank and the idler linkage for biasing the idler linkage into an idler-engaged position responsive to movement of the crank to its second crank position. The control means further includes (1) a valve control arm spring connected between the bell crank and the valve control arm for biasing the valve control arm into a first valve control arm position at the initiation of the twine-wrapping cycle in response to movement of the crank to its second crank position and (2) a valve control arm latch for preventing movement of the valve control arm from its first to its second position until the twine arm is shifted from a first side of the baler to the second. Upon the twine arm reaching the second side of the baler, the latch is released and the valve control arm is shifted to its second position under the bias of the valve control arm spring, thereby conditioning the hydraulic drive means to restore the twine arm from second to the first side of the baler. The control means automatically shifts the valve control arm to a third position when the hydraulic drive means is deactivated at the termination of its twine-wrapping cycle. The shifting of the valve control arm to the third position requires pivoting of the valve control arm in a generally opposite direction from that required initially for shifting from the third to the first valve control arm positions and from the first to the second valve control arm positions. The control valve is a two-position valve. The valve is shifted to a first of its two positions when the valve control arm is moved into the first valve control arm position and is shifted to its second position when the valve control arm is shifted from its first to its second control arm position. The valve remains in its second position when the valve control arm is shifted from the second to the third valve control arm position.

In accordance with another feature of this invention, gear means provides driving engagement between the hydraulic drive means and the twine arm. The gear means includes a clutch for permitting the dispensing end of the twine arm to dwell adjacent one sidewall of the baler so that additional wraps of twine are wrapped around one end of the bale. In accordance with a preferred embodiment, the clutch means includes first and second gears with tooth-free portions thereon for interrupting the driving engagement therebetween and permitting the continued driving of the second gear without driving the first gear and the twine arm. A bias means is provided to store energy as the twine arm approaches the one sidewall where the arm dwells so that reengagement of the teeth of the first and second gears is assured. The provision of extra wraps of twine around the ends of the bale is desirable to provide better bale integrity at the ends.

In accordance with another feature of this invention, a twine cutter is provided for severing the twine as the twine arm approaches its original position adjacent a first sidewall. The twine cutter has an actuation arm which is movable between three positions. In the first position, the twine knife is disengaged from an anvil against which twine is cut. In the second position, the knife is engaged with the anvil for severing the twine. In the third position, the knife is in engagement with the anvil. In the shifting between the second and third positions, the knife remains stationary. The ability of the actuator arm to continue movement to a third position after the knife is engaged with the anvil permits the twine arm to overtravel. This assures that the knife is reliably engaged with the anvil for twine cutting after component wear and permits lower precision in adjustment and component manufacture to be used.

In accordance with still another feature of the invention, the twine arm comprises a guide support rotatably mounted at one end and having an elongated, exposed surface for guiding a strand of twine from a twine source and a tubular twine guide connected to one end of the support for receiving therethrough the strand of twine passing along the support surface. The tubular guide is substantially shorter than the support. The threading of twine through the guide support and tubular guide is simple and reliable and may be accomplished manually without other tools.

BRIEF DESCRIPTION OF THE DRAWINGS

FIG. 4 is a side elevational view of another portion of the twine-wrapping control mechanism for the automatic twine-wrapping mechanism of FIG. 1.

FIG. 5 is a perspective view of the same portion of the twine-wrapping control mechanism shown in FIG. 4. For clarity the hydraulic pump 38 shown in FIG. 4 is omitted in FIG. 5.

FIG. 6 is a plan view of one embodiment of a twine-dispensing mechanism for the automatic twine-wrapping mechanism in accordance with features of this invention. The twine dispensing mechanism is viewed from the front toward the back of the baler.

FIG. 7 is a front elevational view of the twine dispensing mechanism shown in FIG. 6.

FIG. 8 is a plan view of a second embodiment of a twine dispensing mechanism for the automatic twine-wrapping mechanism in accordance with the features of this invention. The twine-dispensing mechanism is viewed from the front toward the back of the baler.

FIG. 8A is a fragmentary plan view of the twine dispensing mechanism of FIG. 8 showing a gear means with a clutch means disengaging the driving engagement between the gears of the gear means. When the gear means is in this position, the twine arm is permitted to dwell adjacent one side of the baler.

FIG. 9 is a front elevational view of the twine dispensing mechanism of FIG. 8.

FIG. 10 is a fragmentary cross-sectional view of the twine-dispensing mechanism of FIG. 8.

FIG. 12 is a perspective view of a twine cutter of the automatic twine wrapping mechanism in accordance with the features of this invention.

FIG. 13 is a fragmentary side elevational view of the knife of the twine cutter shown in FIG. 12.

FIG. 14 is an enlarged cross-sectional view of the twine tensioner shown in FIG. 7 taken along line 14—14.

FIG. 15 is an enlarged elevational view of the twine tensioner shown in FIGS. 6, 7.

DESCRIPTION OF THE PREFERRED EMBODIMENT

General

Figure 1:
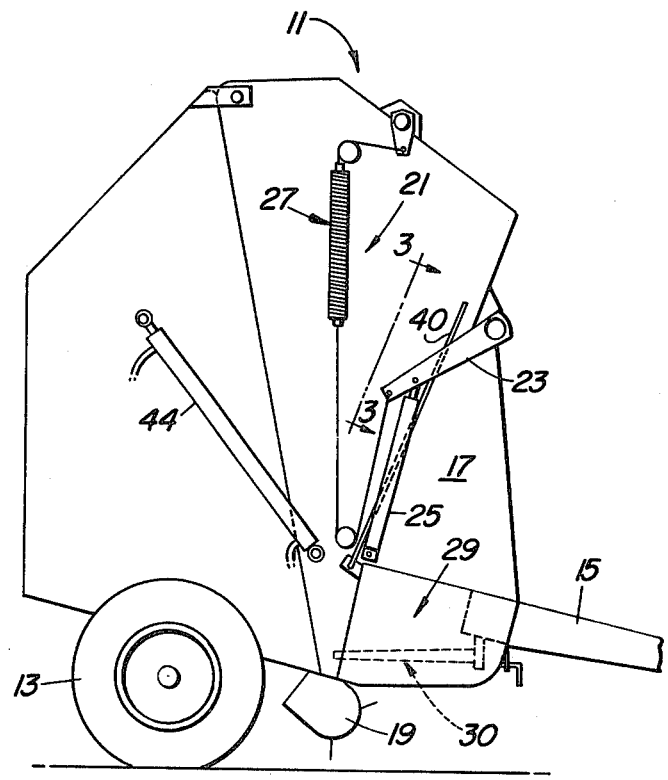
FIG. 1 is a right side, elevational view of a large round baler with an automatic twine-wrapping mechanism in accordance with a preferred embodiment of this invention.
Figure 2:
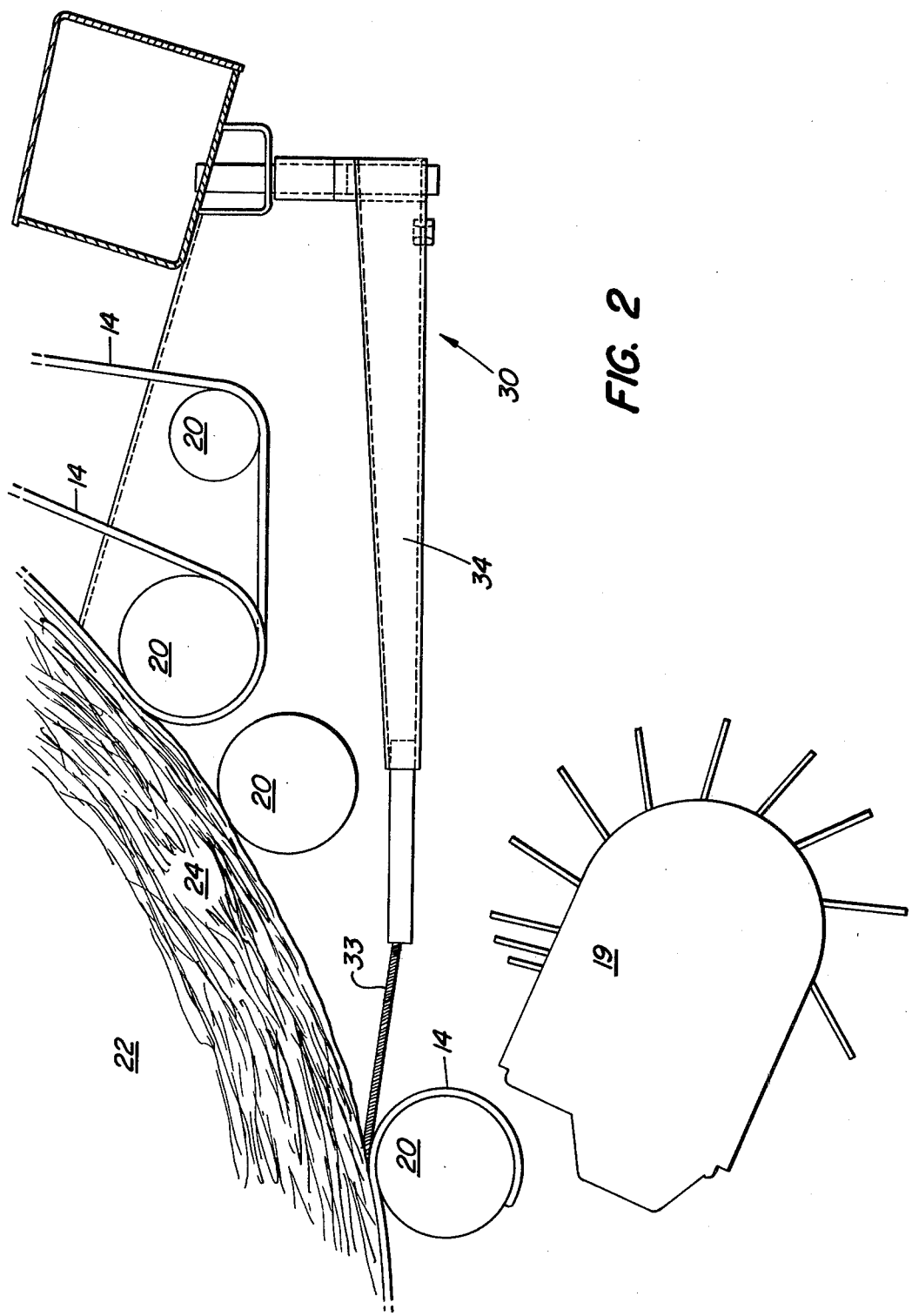
FIG. 2 is a side cross-sectional view of the bale chamber crop inlet of the baler of FIG. 1. The twine arm of the twine dispensing mechanism is shown dispensing twine into the bale chamber.

Reference is now made to FIGS. 1 and 2 which shows a large round baler 11 with an automatic twine-wrapping mechanism 12 in accordance with a preferred embodiment of this invention. FIG. 1 is a simplified side elevational view of baler 11 for forming large cylindrical bales of hay or other crop material. FIG. 2 is a fragmentary cross-sectional, schematic view of the front of baler 11. Baler 11 includes a pair of wheels 13 (only one shown) for mounting baler 11 for pulling via a tractor (not shown) through attachment to tongue 15. The baler is powered through attachment to a conventional rear power take-off mechanism of the tractor. Baler 11 further includes a pair of upright opposite fore-and-aft extending sidewalls 17, 18 interconnected by a plurality of transverse frame members (not shown). A bale-forming chamber 22 is defined between sidewalls 17, 18 by a plurality of belts 14 supported on a plurality of transverse rolls 20 (some of which are shown in FIG. 2). The roll and belt arrangement shown in FIG. 2 is disclosed and claimed in U.S. application Ser. No. 285,178 (U.S. Pat. No. 4,399,746) cross-referenced above, and the disclosure of which is hereby incorporated by reference. Such arrangement forms no part of the invention herein and is shown and described in part herein only to illustrate the general environment in which the twine-wrapping mechanism of this invention is preferably utilized. A crop pick-up mechanism 19 of a conventional construction is mounted beneath sidewalls 17, 18 for feeding crop material into bale-forming chamber 22. When material is fed into the bale-forming chamber 22, and as the bale increases in diameter, the size of the bale-forming chamber and the density of the bale being formed therein is controlled by a tensioning mechanism 21 as described in more detail and claimed in application Ser. No. 308,223, cross-referenced above, the disclosure of which is hereby incorporated by reference. Tensioning mechanism 21 forms no part of the invention herein and thus is only briefly described herein. Tensioning mechanism 21 includes a pair of control arm 23 (only one being shown) mounted respectively on the exterior of sidewalls 17, 18 to which tension is applied by a pair of hydraulic cylinders 25 (only one shown) and a pair of spring mechanisms 27 (only one shown). As a bale 24 being formed increases in diameter, arm 23 is rotated counterclockwise in FIG. 1 against the tension imposed thereon by cylinder 25 and spring mechanism 27. When the bale 24 being formed in the chamber is completed (i.e. reaches a predetermined diameter), a twine wrapping cycle is initiated when the twine-wrapping mechanism 12 is actuated to apply twine to the circumference of bale 24.

Figure 3:
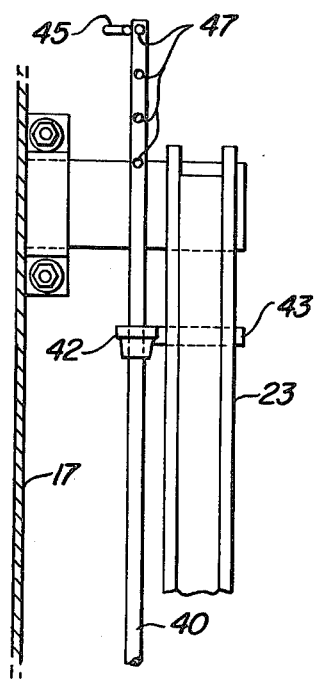
FIG. 3 is a cross-sectional view taken along lines 3—3 of FIG. 1 and showing a portion of the twine-wrapping control mechanism.
Figure 11:
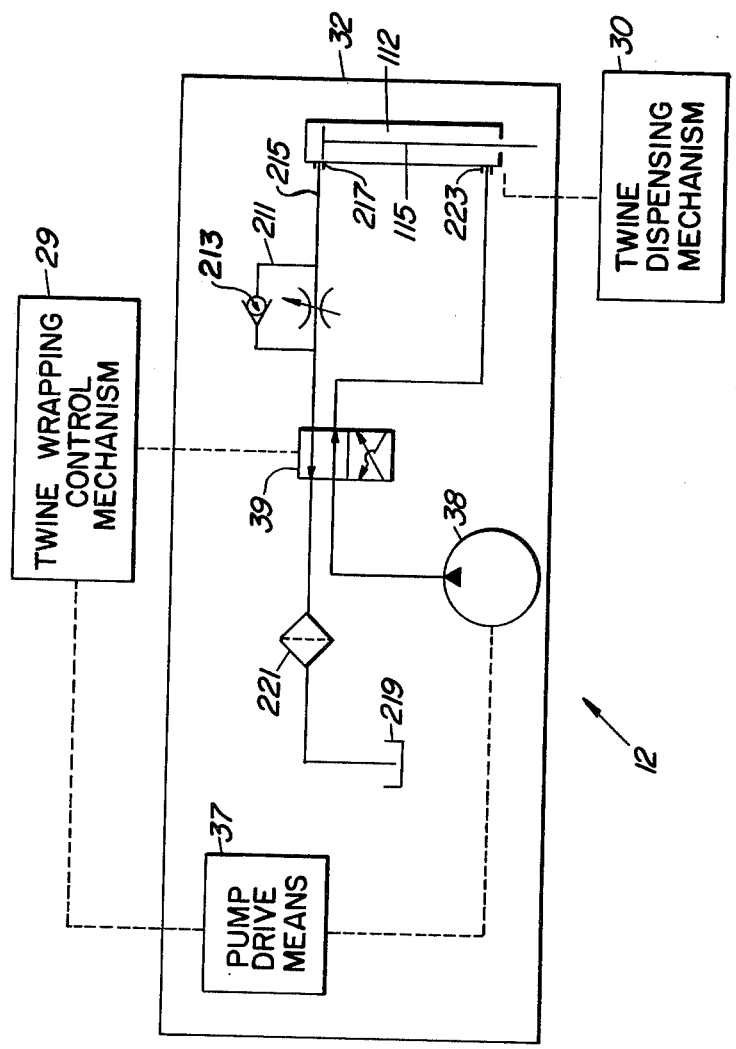
FIG. 11 is a general schematic of the twine wrapping mechanism including a detailed schematic circuit diagram of the hydraulic drive means.

As schematically illustrated generally in FIG. 11, wrapping mechanism 12 includes (1) a twine dispensing mechanism 30 (FIGS. 2, 6, 7) for dispensing twine 33 into chamber 22, (2) a hydraulic drive means 32 (FIG. 11) for cycling a twine arm 34 (FIGS. 2, 5-7) of twine dispensing mechanism 30 back and forth in front of chamber 22 and (3) a twine wrapping control mechanism 29 (FIGS. 3-5) for initiating a twine-wrapping cycle by sensing the growth of bale 24, to a predetermined diameter by automatically actuating a pump drive means 37 driving a hydraulic pump 38 (shown in FIG. 4 and omitted in FIG. 5 for clarity) and by positioning a two-position hydraulic control valve 39 in a first position and for terminating a twine-wrapping cycle by deactivating hydraulic drive means 32 following the wrapping of twine 33 around bale 24. Following completion of the wrapping of a bale in the bale-forming chamber 22 by the dispensing of twine 33 from twine-dispensing mechanism 30, twine 33 is severed automatically by a twine cutter 35 shown in FIGS. 12, 13. Following the cutting of the twine 33, the baler operator actuates a bale ejection mechanism (not shown) which actuates a hydraulic cylinder 44 (FIG. 1) for opening bale-forming chamber 22 and permitting the bale to roll out onto the ground. Following bale ejection, baler 11 is then ready to begin the formation of another bale therein.

Automatic Twine-Wrapping Control Mechanism

Referring now primarily to FIGS. 1, 3-5 and in accordance with the features of this invention, wrapping control mechanism 29 includes a bale diameter sensing link 40 interconnected between tension control arm 23 and bell crank 41. Link 40 is slidably mounted to tension control arm 23 by insertion through a trunion 42 pivotally mounted to arm 23 at pivot 43. The effective length of link 40 may be adjusted by the disposition of a cotter pin 45 in one of a plurality of holes 47 provided in one end of link 40. The disposition of cotter pin 45 is determinative of the amount of lost motion provided in the movement of tension control arm 23 during bale formation before trunion 42 engages cotter pin 45 and moves link 40 to the upper right in FIG. 1 to initiate the twine-wrapping cycle. The shorter the effective length of link 37, the smaller the diameter of the bale will be at the initiation of the twine-wrapping cycle. Link 40 is bolted to one end of bell crank 41 so that bell crank 41 is movable clockwise from position D corresponding to when the bale chamber is empty or has a bale therein less than a predetermined diameter to position E corresponding to when a completed bale is in chamber 22 and link 40 has moved to the upper right in FIG. 1 at the initiation of the twine-wrapping cycle.

In accordance with another feature of this invention, movement of bell crank 41 to position E shown in FIG. 4 initiates the driving of pump 38 of the hydraulic drive means 32 by actuation of pump drive means 37. One arm 49 of bell crank 41 is connected to one end of an idler tension spring 53. A second end of idler tension spring 53 is connected to a pump drive idler 65 of pump drive 37 via an idler linkage 54 movable between an idler engaged and disengaged positions. Linkage 54 is constituted by (1) an idler bell crank 59, (2) a flange 55 attached to the second end of spring 53 and to a first arm 57 of an idler bell crank 59 and (3) a link 63 connecting a second arm 61 of bell crank 59 to pump drive idler 65. Pump drive idler 65 includes an idler pulley 66 which is rotatably mounted on an arm 67 pivotally mounted at 69.

Pump drive 37 further includes a drive pulley 71 interconnected to the "power take-off" shaft (not shown) of the tractor and a driven pulley 73 interconnected with drive pulley 53 through a belt 75.

The engagement of the pump drive 37 is precisely controlled to be initiated only after the bale 24 has reached a predetermined diameter via an idler latch 77 for locking crank 59 in a first position corresponding to when the bale chamber is empty or when a bale in the chamber has a diameter less than the predetermined value. Latch 77 is actuated by the engagement of a tang 79 connected to the second arm 49 of crank 41 via link 81. Latch 77 is pivotally mounted at 83 and is biased into its latched position via a return spring 86. When crank 41 is rotated clockwise to position E responsive to formation of a bale in the bale chamber of a predetermined diameter, spring 53 is tensioned and at the same time link 81 and tang 79 are moved toward the rear (to the left in FIG. 4) of the baler. With the rearward movement of tang 79, an arm 85 of latch 77 is finally engaged by tang 79 causing latch 77 to pivot counterclockwise about pivot 83 thereby releasing bell crank 59 to be pivoted counterclockwise by the contraction of spring 53. With the shifting of crank 59 counterclockwise, idler 65 is moved to engage and tension belt 75 providing driving engagement between pulleys 71, 73.

At the end of the twine-wrapping cycle, an idler return spring 84 connected between a frame member 82 and flange 55 biases idler linkage 54 to its idler disengaged position in the absence of an overriding bias from spring 53. Linkage 54 is then locked in this position by latch 77.

In accordance with another feature of this invention, control mechanism 29 (FIG. 4) is further operative to control the actuation of two-position hydraulic control spool valve 39 by shifting valve control arm 89 between three valve control positions, namely, position A, a rest position in which arm 89 is disposed between twine wrapping cycles, position B for movement of the twine arm 34 from the left side to the right side and position C for movement of the twine arm 34 from the right side back to the left side. When control arm 89 is in position A and C, valve 39 is in the position shown in FIG. 11. When control arm 89 is in position C, valve 39 is in its second position not illustrated in FIG. 11 but formed by connecting the lower envelope of the valve 39 into the hydraulic circuit of FIG. 11. Referring again to FIG. 5, control mechanism 29 further includes a valve control arm spring 91 connected between tang 79 and valve control arm 89 and for biasing control arm 89 into positions B and C responsive to the formation of a completed bale in chamber 22. A control arm return spring 93 is attached to control arm 89 for biasing control arm into position A at the end of a wrapping cycle when the bias of spring 91 is relieved. When a bale of a predetermined diameter is formed in the bale-forming chamber and crank 41 is rotated counterclockwise, sufficient tension is imposed by spring 91 on an arm 89 to overcome the resistance of spring 93 to move arm 89 from position A to position B. When so positioned, the hydraulic drive means 32 shifts twine arm 34 from the left side to the right side. Control arm 89 is prevented from moving from position B to C by a control arm latch 95. Latch 95 comprises a latch member 99 with a finger 97 at one end engageable with the lower surface of control arm 89 and a latch actuation arm 101 which is interconnected with latch member 99 via a link 103. When control arm 89 is shifted from position A to B; a pin 92, pivoted at one end to a lower plate 94 of control arm 89 and connected at the other to the spool of valve 39, is pulled outwardly so that one end of plate 94 engages the top of finger 97 and the other engages the bottom of a stop 106. Latch member 97 is rotatably mounted in side wall 17 and is rotatable counterclockwise against the bias of a spring 105 responsive to the engagement of actuation arm 101 with twine arm 34 at the end of its travel from the left side to the right side of the baler. Upon rotation of latch member 99 counterclockwise, spring 91 shifts control arm 89 into position C which results in the twine arm 34 being driven from the right side to the left side of the baler. In moving from position B to C, plate 94 is shifted counterclockwise and downwardly to shift pin 92 inwardly.

In operation, as crop material is fed into bale-forming chamber 22, a bale 24 grows in diameter. The size of chamber 22 is controlled by tension control arms 23 which are pivoted clockwise in FIG. 1. As bale 24 nears completion, trunion 42 (FIG. 3) on control arm 23 engages cotter pin 45 at the end of sensing link 40. Thereafter, sensing link 40 is moved upwardly with control arm 23. With movement of sensing link 40, bell crank 41 (FIGS. 4, 5) begins to pivot clockwise from position D toward position E which begins to stretch idler tension spring 53 and valve control arm spring 91. When bell crank 41 reaches position E, tang 79 has engaged and pivoted arm 85 of latch 77 to release bell crank 59, then the tension in spring 53 is applied to idler linkage 54 moving linkage 54 into an idler engaged position against the bias of idler return spring 84. Pump drive 37 is thus activated to activate pump 38 thereby activating hydraulic drive means 32 (FIG. 11) for twine dispensing mechanism 30.

As valve control spring 91 is tensioned by the movement of bell crank 41 from position D toward position E, sufficient force is applied to the control arm 89 to overcome the force applied to control arm 89 by return spring 93 resulting in the shifting of control arm 89 from position A to position B (FIG. 4). Control arm 89 assumes position B prior to tang 79 releasing latch 77 to engage pump drive 53. In moving from position A to B control arm 89 moves counterclockwise and upwardly relative to pin 92 which is pulled upwardly to set the hydraulic drive means 32 to shift twine arm 34 from the left side adjacent side wall 18 to the right side adjacent side wall 17. When twine arm 34 reaches the right side and engages actuator arm 101 (FIGS. 5, 6) to release latch 95, control arm 89 (FIG. 4) is shifted from position B to C under the bias of spring 91. This movement results in the shifting of pin 92 of valve 39 inwardly to reverse hydraulic drive means 32. When reversed, twine arm 34 is driven from the right side to the left side. Upon reaching the end of travel, twine arm 34 engages cutter mechanism 35 (FIGS. 6, 12) which is activated to sever twine 33. The baler operator then activates a conventional mechanism (not shown except for cylinder 37) to eject bale 24 from chamber 22. Following ejection, tension control arm 23 is rotated counterclockwise permitting sensing link 40 to be shifted downwardly. As sensing link 37 is shifted downwardly, bell crank 41 is permitted to pivot from position E toward position D under the bias of springs 53, 84, 91, 93. Idler return spring 84 restores idler linkage 54 to its idler disengaged position deactivating pump drive 37 and permitting bell crank 59 to be locked into this position by latch 77.

As bell crank 41 is moved from position E to D, the tension on spring 91 is being reduced and reaches a level such that return spring 93 shifts control arm 89 from position C to A. During this movement the position of valve 39 is unchanged. With the deactivation of pump drive 53 and the restoring of control arm 89 from position C to A, the bale wrapping cycle is thus ended and is conditioned for initiation of a subsequent twine wrapping cycle when the formation of another bale is completed.

Twine Dispensing Mechanism

Referring now to FIGS. 6, 7, 14 and 15, one embodiment of a twine-dispensing mechanism 30 is illustrated. In accordance with a feature of this invention the twine dispensing mechanism 30 includes a twine arm 34 comprised of a tubular guide 107 for receiving a strand of twine therethrough, a U-shaped guide support 109, a twine tensioner 114 and a conventional twine supply (not shown) for supplying twine 33 to arm 34.

Guide support 109 has an elongated exposed surface 116 along which twine from said source passes prior to entering into guide 107. Guide 107 is much shorter than support 109 so that threading is greatly simplified by passing the twine along surface 116 of support and threading it through tensioner 114 and guide 107. Because guide 107 is short, e.g. about 16 c.m., threading may be easily accomplished by hand without use of any mechanical threading device. Prior art designs using an elongated tube for the entire length of the twine arm have typically required a mechanical threading device such as a wire to assist in threading the twine through the tubular guide.

Twine tensioner 114 provides a simplified mechanism for mounting twine 33 on surface 116 and provides sufficient tension in twine 33 to prevent tangling and unthreading of the twine from the source (not shown) to the guide 107. Tensioner 114 (FIGS. 15, 16) includes a plate 118 and mounting means 122, including a pin 124 and a coaxially mounted spring 126 for pivotally mounting plate 118 on support 109 and for spring biasing plate 118 against surface 116. A pair of guide pins 128, 130 are disposed adjacent to twine entrance and twine exit sides 136, 138 of plate 118 and defines with pin 124 a twine path through the tensioner. Entrance side 136 has a beveled edge 139 permitting easy, free movement of the twine 33 through the tensioner 114. The distance between pins 128, 130 is approximately equal to the width of plate 118 plus the diameter of twine 33 so that twine 33 may pass between the plate sides 136, 138 and the pins 128, 130, respectively, (one at a time during threading). A top side 140 extending between sides 136, 138 is also provided with a beveled edge 142 permitting easy insertion of twine 33 under plate 116. Exit edge 138 is not beveled and lies in the plane of plate 116 so as to engage twine 33 and to resist the accidental unthreading of twine 33 by movement from the right to the left in FIG. 7.

Twine arm 34 is movable back and forth in front of the bale-forming chamber between a first position of about −15° (here shown as the full line position on the left-hand side of the baler in FIG. 6) and a second position of about 195° (here shown as the dotted line position of twine arm 34 in FIG. 6). Twine arm 34 is moved back and forth between the first and second positions by a hydraulic cylinder 112 of hydraulic drive means 32 (FIG. 11). Twine arm 34 is fixed to a twine arm gear 110 rotatably mounting in an arm support 109. Cylinder 112 is connected in driving engagement with twine arm gear 110 by a link 103 pivotally mounted to one end of a piston 108 of cylinder 112 and fixed at the other end to a hydraulic cylinder drive gear 117. Gear 117 is pivotally mounted in twine arm support 111 midway between sidewalls 17, 18 and in direct driving engagement with twine arm gear 110.

Twine guides 113 and 115 are respectively attached to sidewalls 18, 17 to restrict the path of twine 33 into the bale-forming chamber. Twine 33 through engagement with guides 113, 115 is not permitted to move closer to sidewalls 18, 17 than the location of the vertical leg portions 117, 119 of guides 113, 115 respectively resulting in the winding of additional wraps of twine around each end of the bale being formed in the bale-forming chamber. The wraps are applied because the arm 34 is swung substantially beyond the point at which twine 33 is initially engaged with guides 113, 115 to reach the first and second positions of about −15° and 195° respectively.

In operation, twine arm 34 in initially positioned on the left side adjacent sidewall 18 at the initiation of a twine wrapping cycle. The cycle is initiated by the control means 29 sensing the formation of a completed bale, shifting valve 39 to a position for extending piston 115 and activating pump drive means 37. Pump 38 then supplies fluid to cylinder 112 and piston 108 is extended. When piston 108 is being extended toward side wall 18 in FIG. 6, twine arm 34 is being rotated from the first left-hand position to the second right-hand position. When twine arm 34 reach a position midway between sidewalls 17, 18, the end of twine 33 catches in the bale-forming chamber by being pulled into the chamber with incoming crop, thereby initiating the wrapping of bale 24. Twine 33 is applied from the midway point to the right side of the bale. Additional wraps are applied to the end of the bale by engagement of twine 33 with guide 115 as twine arm 34 continues to travel until engagement with latch 95. Twine arm 34 engages actuation arm 101 to disengage control arm latch 95 when piston 108 is fully extended. When latch 95 is disengaged, valve control arm 89 moves from position B to position C under the bias of spring 91 and the position of valve 39 is shifted so that hydraulic cylinder 112 is then retracted to drive twine arm 34 from its second position back to its first position as twine 33 is dispensed into chamber 22. When piston 108 is fully retracted, arm 34 engages and operates twine cutter 35 to sever twine 33.

In operation of the twine tensioner 114, twine 33 is threaded through tension 114 by first inserting a twine segment in between beveled edge 142 and surface 116. Next, the twine segment adjacent to the entrance side 136 of plate 116 is pulled outwardly and downwardly pivoting plate 118 clockwise so as to pass between edge 136 and pin 128 and lie between pin 128 and pin 124. Then the twine segment adjacent exit edge 138 is pulled outwardly and downwardly pivoting plate 118 counterclockwise so as to pass between edge 138 and pin 130 and lie between pin 124 and pin 130. Threading of the twine arm is completed by pushing the twine end through guide 123.

From the foregoing operation, it can be seen that threading of twine arm 36 may be quickly and simply accomplished without the need for the operator to perform a tedious task while positioned in a relatively inaccessible area. It will be appreciated by those skilled in the art that tensioner 114 has broad utility in addition to the exemplary round baler application just explained. For example, tensioner may be utilized in bale-tying mechanism for other types of balers and generally in any application where it is necessary to feed twine in one direction under tension.

Reference is now made to FIGS. 8–10 which illustrate a second, alternate embodiment of a twine-dispensing mechanism 120 in accordance with features of this invention. This embodiment of the twine-dispensing mechanism has particular utility with narrow width baler with which it is desirable to use a relatively longer twine arm 121 compared to that used in the first embodiment of the twine-dispensing mechanism 30 for a larger baler shown in FIGS. 6, 7. In actuality, twine arm 121 is preferably equal in length to twine arm 34. The desirability of the use of a relatively longer twine arm 121 will be described in more detail below.

Twine arm 121 is movable back and forth in front of a bale-forming chamber 22 between a first or rest position (here shown as the full-line position on the left-hand side of the baler) of about −30° to a second position (here shown as the dotted line position on the right-hand side of the baler) of about 100° by means of hydraulic drive means 32 (FIG. 11). In addition to twine arm 121 twine dispensing mechanism 120 includes a conventional twine supply (not shown) and gear means 127, which provides driving engagement between hydraulic drive means 32 and twine arm 121. Twine arm 121 is comprised of a tubular guide 123, a guide support 125 connected at one end to guide 123 and at the other end to gear means 127 and a tensioner 144. The design and operation of tensioner 144 is identical to that of tensioner 114 discussed above in connection with the embodiment of FIGS. 6, 7 and therefore further explanation in connection with this embodiment is unwarranted. Gear means 127 includes (1) a first gear 129 which is rotatably mounted in support 131 to the right of the center line between sidewalls 17, 18, which has teeth 133 spaced around a peripheral surface of gear 129 and which is fixed to twine arm 121 and (2) a second gear 143 which is rotatably mounted in support 131 and which has teeth 135 formed around a peripheral surface of gear 143 in direct driving engagement with teeth 133 of gear 129. Gear means 127 is drivable by hydraulic cylinder 112 of drive means 32 through interconnection of second gear 134 with piston 108 of cylinder 112 via a connecting link 137 fixed to gear 134 at one end and pivotally mounted to piston 115 at the other.

In accordance with another feature of this invention, gear means 127 includes a clutch means 141 for permitting the twine arm 121 to dwell in its second position adjacent the right-hand sidewall 17. The dwelling action applies additional wraps around the end of the bale. Clutch means 141 comprises a surface means on at least one of the peripheral surfaces of first gear 129 and second gear 134 for interrupting the driving engagement therebetween and permitting the continued driving of second gear 134 without the driving of first gear 129 and twine arm 121. The surface means is here shown as constituted by a smooth or tooth-free surface portion 143 on the periphery of gear 134 and by a rear or tooth-free surface 145 of gear 129. As is shown in FIG. 8, when twine arm 121 is rotated to its second position adjacent side wall 17 tooth-free surface 143 mates with back surface 145 thereby interrupting the driving engagement between gears 134, 129. In order to assure the reengagement of the clutch means 141 by reengaging teeth 133 with teeth 135, a bias means 147 is provided. Bias means 147 includes a lever 149 fixed to gear 129 and a spring means 151 fixed to the baler frame. Spring means 151 includes a plunger 153 biased by a spring 156 to extend to the upper right in FIG. 8. Spring 156 encircles a rod 153 and is positioned between a support 155 and stop 157 fixed to rod 153. When twine arm 121 is in its second position adjacent sidewall 17, lever 149 engages rod 153 thereby compressing spring 156 to store sufficient energy in spring 156 to assure that the teeth 133 of gear 129 are reengaged with teeth 135 of gear 134 when hydraulic drive means 32 is reversed to restore twine arm 121 to its first position adjacent sidewall 18.

The reversal of hydraulic drive means 32 is carried out in a similar manner to that used for the embodiment shown in FIGS. 5, 6, 7 except for the specific construction of a valve latch 159. Latch 159 includes a latch member 161 with a finger 162 (FIG. 10) which engages the lower surface of valve control arm 89 when control arm 89 is in position B. Counterclockwise rotation of latch member 161 permits control arm 89 to be shifted from position B to position C to effect the reversal of hydraulic drive means 32 to drive twine arm 121 from its second position adjacent sidewall 17 to its first position adjacent sidewall 18. Counterclockwise rotation of latch member 161 is effected by the movement of twine arm 34 to its second position by engagement of link 137 with a latch actuation arm 163 which is interconnected with latch member 161 via (1) bell crank 165 pivotally mounted to sidewall 17 at 167 and (2) a link 169 pivotally mounted at one end to bell crank 165 and at the other end to a latch plate 171. Latch member 161 is pivotably mounted to latch plate 171. Movement of actuation arm 163 to the left in FIG. 8 responsive to the shifting of link 137 by the extension of hydraulic cylinder plunger 115 rotates bell crank 165 clockwise about pivot 167. Clockwise rotation of the bell crank 165 (FIG. 8) effects a counterclockwise rotation of latch member 161 in FIG. 10 through link 169 and latch plate 171. This effects the reversal of hydraulic drive means 32 as explained before by the retraction of cylinder piston 115. Actuation arm 163 is then shifted to the right in FIG. 8 following disengagement by link 137 by the action of a latch return spring 173 which biases bell crank 165 in a counterclockwise direction in FIG. 8 and latch member 161 in a clockwise direction in FIG. 10.

A twine guide 174 is provided on left sidewall 18 to limit the travel of twine 33 while twine arm 121 completes its swing back to its first or rest position. This results in the provision of additional wraps of twine on the left end of bale 24.

In operation, when a bale having a predetermined diameter is formed in the bale-forming chamber, control means 29 shifts the valve control arm 89 from position A to position B to connect the hydraulic drive means 32 to effect the extension of hydraulic plunger 108 from cylinder 112. Control arm 89 is maintained in position B due to engagement with latch member 161 and stop 106. As plunger 108 is extended, link 137 is rotated clockwise to effect clockwise rotation of second gear 134 of gear means 127. Clockwise rotation of gear 134 effects counterclockwise rotation of first gear 129 of gear means 141. In this manner, gear means 127 moves twine arm 121 counterclockwise until clutch means 141 disengages the driving engagement by the engagement of tooth-free surface 143 with back surface 145 of gear 129 thereby causing twine arm 36 to dwell in its second position adjacent sidewalls 17 while gear 134 is continued to be rotated. The dwelling action applied additional wraps of twine around the right end of the bale 24. At the end of the stroke of hydraulic plunger 108, link 137 engages actuator arm 163 of latch 159 to effect a reversal of the hydraulic drive means 32. Latch actuator arm 163 is shifted to the left in FIG. 8 to effect a clockwise rotation of bell crank 165 which in turn effects a counterclockwise rotation of latch member 161. When latch 161 is rotated counterclockwise (FIG. 10), valve control arm 89 is shifted from position B to position C under the bias of spring 91. With valve control arm 89 in position C, hydraulic drive means 32 is reversed to shift twine arm 121 from its second position adjacent sidewall 17 to its first position adjacent sidewall 18.

Simultaneously with the shifting of actuator arm 163 to the left in FIG. 8, lever 149 fixed to gear 129 is compressing spring 156 of spring means 151 to store sufficient energy therein to bias lever 149 clockwise to reengage teeth 133 with the teeth 135. When the reversal of hydraulic drive means 32 has been effected through valve 87 causing the retraction of hydraulic cylinder plunger 108, rotation of twine arm 121 is continued until plunger 108 is fully retracted and arm 121 is restored to its first position adjacent sidewall 18. As the twine arm 121 is restored to this position, the twine cutter 35 is actuated to sever twine 33 as will be explained hereinafter. Completion of the twine wrapping cycle from this point is identical to that described in connection with the embodiment of FIGS. 6 and 7.

One advantage of the embodiment of the twine dispensing mechanism 31 shown in FIGS. 8–10 may be better understood by a comparison with the embodiment of the twine-dispensing mechanism 30 shown in FIGS. 6, 7. In the design of a twine arm, the following objectives are preferred: First, with space limitations, the twine arm must be mounted substantially forward of the bale-forming chamber. Second, the arm must be long enough to reach from its mounting position to a position where the twine is adjacent to the bale-forming chamber so that it can be pulled in by crop material entering the bale-forming chamber. Three, additional wraps of twine should be placed on the ends of the bale. In FIGS. 6, 7 twine arm 34 is short enough to permit overtravel beyond the 0° position and 180° position respectively. That is, the arm 34 in FIG. 6 is swung through an arc of approximately −15° through 195° and provides additional wraps through use of guides 113, 115. These objectives have been met in baler 11 with 156.5 cm width bale chamber and a 73.4 cm length twine arm. However, these design objectives are more difficult to achieve in a smaller width baler with, for example, 117.0 cm width bale chamber. In accordance with the embodiment of FIGS. 8–10, these objectives are achievable with twine arm 121 which may be of the same length as that used in the embodiment of FIGS. 6 and 7. The twine arm may still be pivotably mounted substantially forward of the bale-forming chamber and yet have sufficient length to position twine 33 adjacent to the crop inlet to the bale-forming chamber so as to be picked up by incoming crop material. By the disposition of the pivot axis of the twine arm to the right of the midway point between sidewall 17 and 18, the twine arm is still pivotable beyond a 0° position to an angle of about −15° and is operable to produce, in conjunction with guide 174, additional wraps around the left end of a bale in the chamber. However, the right side the twine arm 36 is pivotable only to an angle of about 113° where the twine arm 36 is permitted to dwell when the clutch means 141 interrupts the driving engagement in gear means 127, thereby providing additional wraps of twine around the right end of the bale. Thus, in accordance with the features of the embodiment of FIGS. 8–10, the design objectives are still achievable with a smaller width baler.

Twine Cutter

Reference is now made to FIGS. 12 and 13 which illustrate in more detail twine cutter 35 in accordance with the features of this invention. Cutter 35 is used in conjunction with both embodiments of the twine-dispensing mechanism shown in FIGS. 6, 7 and in FIGS. 8–10, respectively. For convenience, twine cutter 35 will be explained in conjunction with first embodiment of twine-dispensing mechanism 30 shown in FIGS. 6, 7. Twine cutter 35 includes (1) an anvil 175, (2) a bell crank-shaped knife 177 pivotally mounted on shaft 179 and movable back and forth between an anvil engaging and an anvil disengaging position as shown in FIG. 13 and (3) an actuator means 181 for moving knife 179 back and forth between its anvil-engaging and anvil-disengaging positions responsive to movement of twine arm 34. Actuator means 181 includes an extendable guide means 183 and a control arm 185, one end of which is slidably supported in bracket 186 and the other end of which is slidably supported in slotted fingers 187, 189 forming one end of extendable guide means 181.

A spring bias means 191 biases actuator arm 181 and guide means 183 toward the rear of the baler causing knife 177 to assume its anvil-disengaging position shown in dotted lines in FIG. 13. Spring bias means 191 is here shown as a spring encircling control arm 185 and disposed between bracket 186 and a stop (here shown as a washer 193 and a pin 198 inserted through control arm 185).

A spring bias member 199 biases control arm 185 to a retracted position in slotted fingers 197, 189 toward the rear of the baler. A spring bias member 199 is here shown as a coil spring encircling control arm 185 and disposed between a stop plate 201 formed at one end of extendable guide means 185 and a stop washer and pin 203. Spring means 191 is selected to be weaker than spring member 199 so that control arm 185 and extendable guide means 181 are movable as a unit relative to bracket 186 from a fully retracted control arm position (prior to engagement of control arm 185 by twine arm 34) to a second, extended position against the bias of spring 191 responsive to engagement of twine arm 34 with control arm 185. At the second control arm position, knife 177 is engaged with anvil 175. In accordance with a feature of this invention, movement of twine arm 34 is thereafter continued to further extend control arm 185 from the second position to a third position. During movement of the control arm 185 from the second to the third position, extendable guide means 183 is stationary and movement of control arm 185 is permitted by movement of control arm 185 relative to extendable guide means 183 by compression of spring 199 between washer 203 and stop plate 201. The overtravel of twine arm 34 to move the control arm 185 from its second to its third position is desirable so that adjustment to compensate for wear of the components of cutter 35 is not necessary for a longer period of time. For example, the knife edge may become dull and other components may become worn and loose, and knife 177 will still engage anvil 175 because the overtravel of twine arm 34 will accommodate the longer stroke of control arm 185 needed to engage knife 177 with anvil 175. Furthermore, with a design allowing for overtravel of twine arm 107, initial adjustment and manufacturing tolerances may be less rigorous compared with prior art cutters. It is no longer necessary to carefully control the termination of the movement of the twine arm to coincide exactly with the initial engagement of knifes 177 with anvil 175 to avoid the dulling or bending of knife 177 against anvil 175.

In operation, when cutter 35 is in its unactuated position with knife 177 rotated into a substantially horizontal position, as shown in FIG. 13, due to the bias of spring member 191 on control arm 183 and extendable guide means 185 relative to bracket 186. By design a slight amount of compression is maintained on spring 199 by its placement between stop washer 203 and stop plate 201. Also in the unactuated position, a slight bias is maintained on spring 191 to hold the components in tension. When twine arm 34 is moved from its second position adjacent the side walls 17 to its first position against adjacent sidewall 18, the twine guide 34 engages control arm 185 to extend initially control arm 185 initially from its first unextended position to a second, extended position against the bias of spring 191 until knife 177 contacts anvil 175. During the movement of the control arm from its first to its second position, extendable guide means 183 and control arm 185 move as an integral unit. The length of travel from the first to the second position of control arm 185 may be, for example, about 4 cm. The twine arm 34 thereafter continues to travel to extend control arm 185 further from its second position to its third position against the bias of spring 199. Spring 199 is compressed and allows control arm 185 to move relative to the now fixed, extendable guide means 183. The length of travel from the second to the third position of control arm may be, for example, about 0.6 cm. Twine 33 is severed upon the initial engagement of knife 177 with anvil 175 when control arm 185 assumes its second position. Cutter mechanism 35 is maintained in its actuated condition until another twine-wrapping cycle is initiated by the sensing of the formation of a completed bale. When a bale is completed, control means 29 activates hydraulic drive means 32 to drive twine arm 34 from its first position adjacent sidewall 18 to its second position adjacent sidewall 17. The counterclockwise movement of twine arm 34 permits springs 191 and 199 to restore guide means 183 to its retracted position, control arm 185 to its first position and knife 177 to its anvil disengaged position. The cutter is maintained in this unactuated condition until twine arm 34 is returned to its first position adjacent sidewall 18 by the reversal of the hydraulic drive means 32.

Hydraulic Drive Means

Reference is now made to FIG. 11, which illustrates a general schematic of twine wrapping mechanism 12 including a detailed schematic circuit diagram of the reversible hydraulic drive means 32 for cycling the twine arms 34, 121 of the two embodiments of the twine-dispensing mechanism 30, 120 shown in FIGS. 6, 7 and in FIGS. 8–10, respectively, back and forth in front of the bale-forming chamber 22. The drive means 32 includes the double-acting hydraulic cylinder 112, hydraulic pump 38 connected to cylinder 112 through the four-way, two position spool valve 87. An adjustable flow control valve 211 with a bypass 213 is provided in line 215 interconnecting one port of valve 39 with a base port 217 of hydraulic cylinder. By the action of flow control valve 211, fluid flow to the left is controlled and fluid flow to the right flows through bypass 213 and is uncontrolled. Thus fluid flow to extend the piston 115 of the hydraulic cylinder 112 is uncontrolled while fluid flow to retract the piston of the hydraulic cylinder is controlled. A fluid reservoir 219 is also connected to valve 39 through a filter strainer 221.

In operation, FIG. 11 illustrates the condition of the hydraulic drive means between bale wrapping cycles, that is, when the bale chamber is empty or during the formation of a bale in the bale-forming chamber. Between bale-wrapping cycles, valve control arm 89 is in position A (FIG. 4). In this position, pump 38 is not driven by pump drive 37, thus, no fluid is flowing into a forward port 223 of the cylinder from pump 38. When a completed bale is formed, control means 29 initially shifts valve control arm 89 from position A to B and thereafter activates pump drive means 37 for pump 38. When valve control arm 89 is shifted from position A to position B, the spool of the valve is shifted outwardly of valve 39 completing the fluid path between pump 38 and base port 217 through the bypass 213 of flow control valve 211. Following activation of pump drive 38, the plunger 115 of the cylinder 112 is extended and fluid flows from forward port 223 through valve 87, filter strainer 221 and into reservoir 219. When control arm 89 is shifted from position B to position C, the spool of valve 39 is moved inwardly to complete the fluid path between pump 38 and forward port 223 to cause the plunger 115 of the cylinder 112 to retract. During retraction, fluid from base port 217 flows through adjustable flow control valve 211, which controls the rate of flow therethrough. From valve 211 fluid passes through valve 39, filter strainer 221 and thereafter into reservoir 219. Twine 33 is severed by cutter 35 (FIGS. 6, 7) when plunger 115 is fully retracted. The wrapping of the bale is now complete and the bale is ejected by the operator. Following ejection, wrapping control mechanism 29 deactivates pump drive means 37 and shifts valve control arm 89 from position C to A. When control arm 89 is shifted from position C back to A, the position of the spool of valve 87 is unchanged. Hydraulic drive means 32 is thus deactivated until the initiation of another bale-wrapping cycle.

I claim:

1. In an automatic twine-wrapping mechanism for a cylindrical baler having a bale-forming chamber, said mechanism comprising:

a twine-dispensing mechanism for dispensing twine into the bale-forming chamber of said baler for wrapping around a bale being formed therein, said dispensing mechanism including a twine arm movable back and forth in front of the bale-forming chamber between first and second positions, and hydraulic drive means for cycling said twine arm back and forth in front of said bale-forming chamber, said drive means including a double acting cylinder, a hydraulic pump connected to said cylinder, and pump drive means for selectively driving said pump, and a control valve interconnected between said cylinder and said pump, said valve having a valve control arm movable between a first valve control arm position permitting said twine arm to be driven from the first to said second twine arm position and a second valve control arm position permitting said twine arm to be driven from said second to said first twine arm position the improvement comprising;

a control means (1) for initiating a twine wrapping cycle by automatically actuating said pump drive means and by positioning said valve control arm in said first valve control arm position responsive to the formation of bale of a predetermined diameter in said chamber, and (2) for deactivating said hydraulic drive means following completion of the wrapping of twine around said bale.

2. The mechanism of claim 1 wherein said control means includes a bell crank movable responsive to the change in diameter of a bale in said chamber between a first crank position corresponding to when the bale chamber is empty or when a bale in said chamber has a diameter less than a predetermined value and a second crank position corresponding to when a bale in the chamber has a diameter greater than a predetermined value.

3. The mechanism of claim 2 wherein said pump drive means includes a pair of pulleys, a belt trained on said pulleys and an idler movable into and out of engagement with said belt, and said control means includes (1) an idler linkage connected to said idler, and (2) an idler spring, connected between said bell crank and said idler linkage, for biasing said idler linkage into said idler engaged position in response to movement of said crank to said second crank position.

4. The mechanism of claim 3 wherein said control means further includes an idler latch for locking said idler linkage in said idler disengaged position and a tang connected to said bell crank for opening said latch when a bale in said chamber has reached a predetermined diameter.

5. The mechanism of claim 4 wherein said control means further includes (1) a crank return spring connected to said crank for biasing said crank into said first crank position when the bale chamber is empty, and (2) a latch return spring for biasing said idler latch into said closed position.

6. The mechanism of claims 2, 3 or 4 wherein said control means includes a valve control arm spring connected between said bell crank and said valve control arm for biasing said valve control arm into said first valve control arm position at the initiation of said twine-wrapping cycle in response to movement of said crank responsive to the increase in diameter of a bale being formed in said chamber.

7. The mechanism of claim 6 wherein (1) said valve control arm spring biases said valve control arm from said first toward said second valve control arm positions, and (2) said control means further includes a valve control arm latch for preventing movement of said control arm into said second control arm position, said latch having an actuator arm for engaging by said twine arm when said twine arm is moved from said first arm position to said second arm position for releasing said latch and for permitting said valve control arm to move from said first to said second valve control arm position.

8. The mechanism of claim 7 wherein control means further including a valve arm return spring biasing said valve control arm from said second toward said first control arm position when said bell crank is in said first crank position.

9. The mechanism of claim 8 wherein (1) said valve arm return spring biases said valve control arm into a third position, and (2) said control means automatically moving said valve control arm from said third to said first valve control arm position by the bias of said valve control arm spring at the initiation of said twine-wrapping cycle.

10. The mechanism of claim 9 wherein (1) said control valve is a two-position valve, and (2) said valve is in the same position when said valve control arm is in said second and third valve control arm positions.

11. The mechanism of claim 9 wherein (1) said valve is a two-position spool valve having a pin fixed thereto and said valve control arm comprises a lever pivotably mounted to said pin, said valve control arm is pivoted relative to the pivot point of the lever and pin in a first direction when said valve control arm is shifted, in order, among said third, first and second valve control arm positions and in an opposite direction when said valve control arm is shifted from said second to said third valve control arm positions, and (2) said valve is in the same position when said valve control arm is in said second and third valve control arm positions.

12. The mechanism of claims 1, 2, 3 or 4 wherein (1) said valve control arm is movable to a third valve control arm position at the completion of said twine-wrapping cycle, (2) said valve is a two-position spool valve having a pin fixed thereto and said valve control arm comprises a lever pivotably mounted to said pin, said valve control arm is pivoted relative to the pivot point of the lever and pin in a first direction when said valve control arm is shifted, in order, among said third, first and second valve control arm positions and in an opposite direction when said valve control arm is shifted from said second to said third valve control arm positions, and (3) said valve is in the same position when said valve control arm is in said second and third valve control arm positions.

13. The mechanism of claim 1 wherein said control means automatically shifts said valve control arm into a third position when hydraulic drive means is deactivated at the termination of said twine-wrapping cycle.

14. In a twine dispensing mechanism for a round baler having a bale-forming chamber formed between a pair of sidewalls, said mechanism comprising: a twine arm having a twine-dispensing end, reversible drive means for driving said twine arm through a twine wrapping cycle for applying twine to a bale in said chamber during the movement of said arm from a rest position to a second position adjacent one sidewall of the baler and then to a third position adjacent the other sidewall, and gear means pivotably mounting said twine arm and for providing driving engagement between said drive means and said twine arm, said gear means comprising: (1) a clutch means for permitting the dispensing end to dwell in said second position and apply a plurality of wraps of twine around the end of said bale adjacent said one sidewall, (2) a first gear in driving engagement with said twine arm and having teeth around a peripheral surface thereof and (3) a second gear in driving engagement with said drive means and having teeth around a peripheral surface thereof in direct driving engagement with the teeth of said first gear, the improvement comprising:

said clutch means comprising a surface means on one of said first and second gear surfaces for interrupting the driving engagement therebetween and permitting the continued driving of said second gear by said drive means without driving said first gear and said twine arm whereby said dispensing end dwells in said second position and said first and second gears transmit the drive from said drive means to said twine arm for moving said twine arm back and forth among said rest, second and third positions.

15. The mechanism of claim 14 wherein said drive means comprises a hydraulic cylinder connected to said gear means.

16. The mechanism of claim 14 wherein said surface means is a tooth-free surface.

17. The mechanism of claim 14 further comprising bias means for biasing said first gear back into driving engagement with said second gear following the interruption of the driving engagement therebetween.

18. The mechanism of claim 17 wherein said bias means comprises a spring means and a lever connected to said first gear, said lever engaging said spring means during the movement of said twine arm toward said one sidewall prior to actuation of said clutch means and biasing said spring means to store energy in the spring means, said energy released when said drive means is reversed to drive said twine arm from said one sidewall toward the other sidewall.

19. In a twine-wrapping mechanism for a round baler having a bale-forming chamber formed between a pair of sidewalls, said mechanism comprising
a twine-dispensing arm movable back and forth transversely of said chamber,
a twine cutter comprising an anvil, a knife movable between anvil-engaging and -disengaging positions, and an actuator means including a control arm movable from a first position to a second position responsive to the movement of said twine arm toward one sidewall to a predetermined position, said actuator means moving said knife from said anvil-disengaging to said anvil-engaging position when said control arm is moved from said first to said second position, the improvement comprising said actuator means further comprising extendable guide means connected to said control arm and said knife for permitting said control arm to extend from said second position to a third position responsive to the continued movement of said twine arm toward said one sidewall and beyond said predetermined position, said actuating means maintaining said knife in said anvil-engaging position when said control is in and during movement to said third position.

20. The cutter of claim 19 wherein further comprising a bracket fixed relative to said sidewalls, a first bias means biasing said control arm relative to said bracket to said first position, said guide means comprising a bias member biasing said control arm to a retracted position, said bias means being weaker than said bias member, said control arm and guide means movable as a unit relative to said bracket and against the bias of said bias means when said control arm is moved from said first to said second position, said guide means connected at one end to said knife at the other end to said control, said guide means terminating movement when said knife reaches said anvil-engaging position, said guide means and said knife remaining stationary when said control arm is moved relative thereto from said second to said third position by movement against the bias of said bias member.

21. The cutter of claim 20 further comprising a knife pivot, said knife forming a bell crank on said pivot, said guide means pivotably mounted at one end to one end of said crank, said guide means further comprising, at the other end, a pair of slotted fingers, said control arm further comprising a pin slidably mounted in the slots of said fingers, said bias member biasing said control arm to its retracted position with said pin at one end of the slots.

22. The cutter of claim 21 wherein said control arm is rod-shaped, said bias means is a spring positioned on said arm between said bracket and said fingers, said fingers include a stop with an opening therein, said arm extending through said opening, and said bias member is a spring positioned on said control arm between said pin and said stop.

23. The cutter of claim 22 wherein said control arm has a contact portion at one end, said actuator means is moved responsive to said twine arm by engagement of one end of said arm with the contact portion of said control arm.

24. In a twine-dispensing mechanism of a twine-wrapping mechanism for a round baler having a bale-forming chamber formed between a pair of sidewalls, said dispensing mechanism comprising:
a twine arm movable back and forth transversely of said chamber for guiding a strand of twine into the chamber for wrapping around a bale formed in said chamber; said twine arm comprising a guide support rotatably mounted at one end relative to said chamber, said support having an elongated, exposed surface for guiding a strand of twine and a tubular twine guide connected to the opposite end of said support for receiving therein said strand of twine passing along said support surface and for guiding said strand, said tubular guide being substantially shorter than said support, the improvement comprising;
said twine arm further comprising a twine tensioner fixed to said support surface for supporting said strand on said surface.

25. The dispensing mechanism of claim 24 wherein said guide support is a U-shaped channel.

26. The dispensing mechanism of claim 24 wherein said tensioner comprises (1) a plate, (2) mounting means for spring biasing said plate against said exposed surface, (3) a first and second guide pins spaced adjacent to opposed twine entrance and exit sides, respectively, of said plate, and (4) a twine path defined between said guide pins on one side of the path and said mounting means on the other side of said path.

27. The mechanism of claim 26 wherein said mounting means is comprised of a pin and a spring mounted coaxially of said pin.

28. The mechanism of claim 27 wherein said twine entrance side has an edge beveled away from said exposed surface and said plate has a third side extending between said entrance and exit sides and having an edge beveled away from said exposed surface.

* * * * *